US008737464B1

(12) United States Patent
Zhang et al.

(10) Patent No.: US 8,737,464 B1
(45) Date of Patent: May 27, 2014

(54) ADAPTIVE QUANTIZATION FOR PERCEPTUAL VIDEO CODING

(75) Inventors: Huipin Zhang, Santa Clara, CA (US); Jing Wu, Zhejiang (CN); Sijia Chen, Zhejiang (CN); Dunbi Huang, Zhejiang (CN); Yi Guo, Zhejiang (CN)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 13/187,900

(22) Filed: Jul. 21, 2011

(51) Int. Cl.
*H04N 11/02* (2006.01)

(52) U.S. Cl.
USPC ..................................................... 375/240.03

(58) Field of Classification Search
USPC ............................................................. 375/240.03
See application file for complete search history.

(56) References Cited

U.S. PATENT DOCUMENTS

| | | | |
|---|---|---|---|
| 6,335,990 B1 | 1/2002 | Chen et al. | |
| 6,639,942 B1 * | 10/2003 | Bayazit | 375/240.01 |
| 6,959,044 B1 | 10/2005 | Jin et al. | |
| 7,194,137 B2 | 3/2007 | Chen et al. | |
| 7,203,372 B1 | 4/2007 | Chen et al. | |
| 7,212,681 B1 | 5/2007 | Chen et al | |
| 7,242,328 B1 | 7/2007 | Chen et al. | |
| 7,324,699 B2 | 1/2008 | Chen et al. | |
| 7,394,942 B2 | 7/2008 | Chen et al. | |
| 7,454,073 B2 | 11/2008 | Chen et al. | |
| 7,454,076 B2 | 11/2008 | Chen et al. | |
| 7,471,840 B2 | 12/2008 | Toebes et al. | |
| 7,471,841 B2 | 12/2008 | Wu et al. | |
| 7,483,584 B2 | 1/2009 | Chen et al. | |
| 7,486,212 B2 | 2/2009 | Chen et al. | |
| 7,492,956 B2 | 2/2009 | Chen et al. | |
| 7,499,595 B2 | 3/2009 | Chen et al. | |
| 7,499,596 B2 | 3/2009 | Chen et al. | |
| 7,620,258 B2 | 11/2009 | Chen et al. | |
| 7,680,349 B2 | 3/2010 | Chen et al. | |
| 7,912,306 B2 | 3/2011 | Chen et al. | |
| 7,949,195 B2 | 5/2011 | Tian et al. | |
| 8,135,062 B1 * | 3/2012 | Cote | 375/240.03 |
| 2008/0170620 A1 * | 7/2008 | Zhang | 375/240.18 |
| 2009/0238278 A1 | 9/2009 | Mauchly et al. | |
| 2010/0131980 A1 | 5/2010 | Rodriguez et al. | |
| 2010/0132007 A1 | 5/2010 | Rodriguez et al. | |

OTHER PUBLICATIONS

Zhang et al., "Determining Optimal Configuration of Video Encoding Parameters Using Numerical Search Algorithms," SPIE-IS&T, vol. 6822, pp. 682211-1-682211-7, 2008.
"VideoLan—x264, the best H.264/AVC encoder;" http://www.videolan.org/developers/x264.html, 2011.

(Continued)

*Primary Examiner* — Dave Czekaj
*Assistant Examiner* — Leron Beck
(74) *Attorney, Agent, or Firm* — Edwards Wildman Palmer LLP; James M. Behmke; Stephen D. LeBarron

(57) ABSTRACT

In one embodiment, a perceptual video coder obtains local video content, and calculates a feature index for each of one or more features of a video unit of the local video content. Each feature index is then directly mapped to a delta quantization parameter (QP) using a linear fractional model that explicitly establishes a relation between the delta QP and a Human Visual System (HVS) insensitivity index, e.g., where the delta QP is set based on a comparison between a local strength of the HVS insensitivity index and an overall strength of a particular frame of the local video content. Accordingly, a QP of an adaptive quantization may be refined by adding to it each delta QP, such that adaptive quantization may be performed on the video unit based on the refined QP.

23 Claims, 10 Drawing Sheets

(56) References Cited

OTHER PUBLICATIONS

Puri et al., "Motion-Compensated Video Coding with Adaptive Perceptual Quantization", IEEE Transactions on Circuits and Systems for Video Technology, vol. 1, No. 4, pp. 351-361, Dec. 1991.
"MPEG-2, Test Model 5 (TM5)," Doc. ISO/IEC JTC1/SC29/WG11/93-400, Test Model Editing Committee, http://www.mpeg.org/MPEG/MSSG/tm5/Overview.html, Apr. 1993.
Sultan et al., "Adaptive quantization scheme for MPEG video coders based on HVS (Human Visual System)," SPIE, vol. 2668, pp. 181-188, Feb. 1996.
Tan et al., "Classified Perceptual Coding with Adaptive Quantization," IEEE Transactions on Circuits and Systems for Video Technology, vol. 6, No. 4, pp. 375-388, Aug. 1996.

* cited by examiner

US 8,737,464 B1

ADAPTIVE QUANTIZATION FOR PERCEPTUAL VIDEO CODING

TECHNICAL FIELD

The present disclosure relates generally to video coding, and, more particularly, to adaptive quantization for perceptual video coding.

BACKGROUND

Adaptive quantization plays a critical role at enhancing perceptual video quality in video encoding. The sensitivity of the Human Visual System (HVS) varies according to the local content of the video. That is, finer quantization is applied in regions where HVS is more sensitive, and coarser quantization is applied where HVS is less sensitive. The sensitivity of HVS may be characterized by various features such as motion, texture, contrast, etc.

According to a typical procedure of adaptive quantization, for a particular feature of the video content, an index corresponding to a region such as a macro-block (MB) is first calculated. The index value indicates how much the HVS is sensitive to the content of the region. At a second step, the refinement of a quantization parameter (QP), called delta QP, for the region, is determined using this index, based on a model on this index. In a third typical step, the delta QP is added to the previously set QP, which may be a global QP flat at the frame level or the slice level. Subsequently, with the revised QP, the target quantization is performed for the region.

The effectiveness of such a solution, however, relies on many factors, including but not limited to, the selection of a feature and the calculation of its index, the mapping of the delta QP from the feature index, and the control of a bit-rate change due to the QP adjustment.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a perceptual video coder obtains local video content, and calculates a feature index for each of one or more features of a video unit (e.g., macro-block, region, frame, etc.) of the local video content. Each feature index is then directly mapped to a delta quantization parameter (QP) using a linear fractional model that explicitly establishes a relation between the delta QP and a Human Visual System (HVS) insensitivity index, e.g., where the delta QP is set based on a comparison between a local strength of the HVS insensitivity index and an overall strength of a particular frame of the local video content. Accordingly, a QP of an adaptive quantization may be refined by adding each delta QP to the QP, such that the adaptive quantization may be performed on the video unit (e.g., macro-block, region, frame, etc.) of the local video content based on the refined QP.

Description

Figure 1:
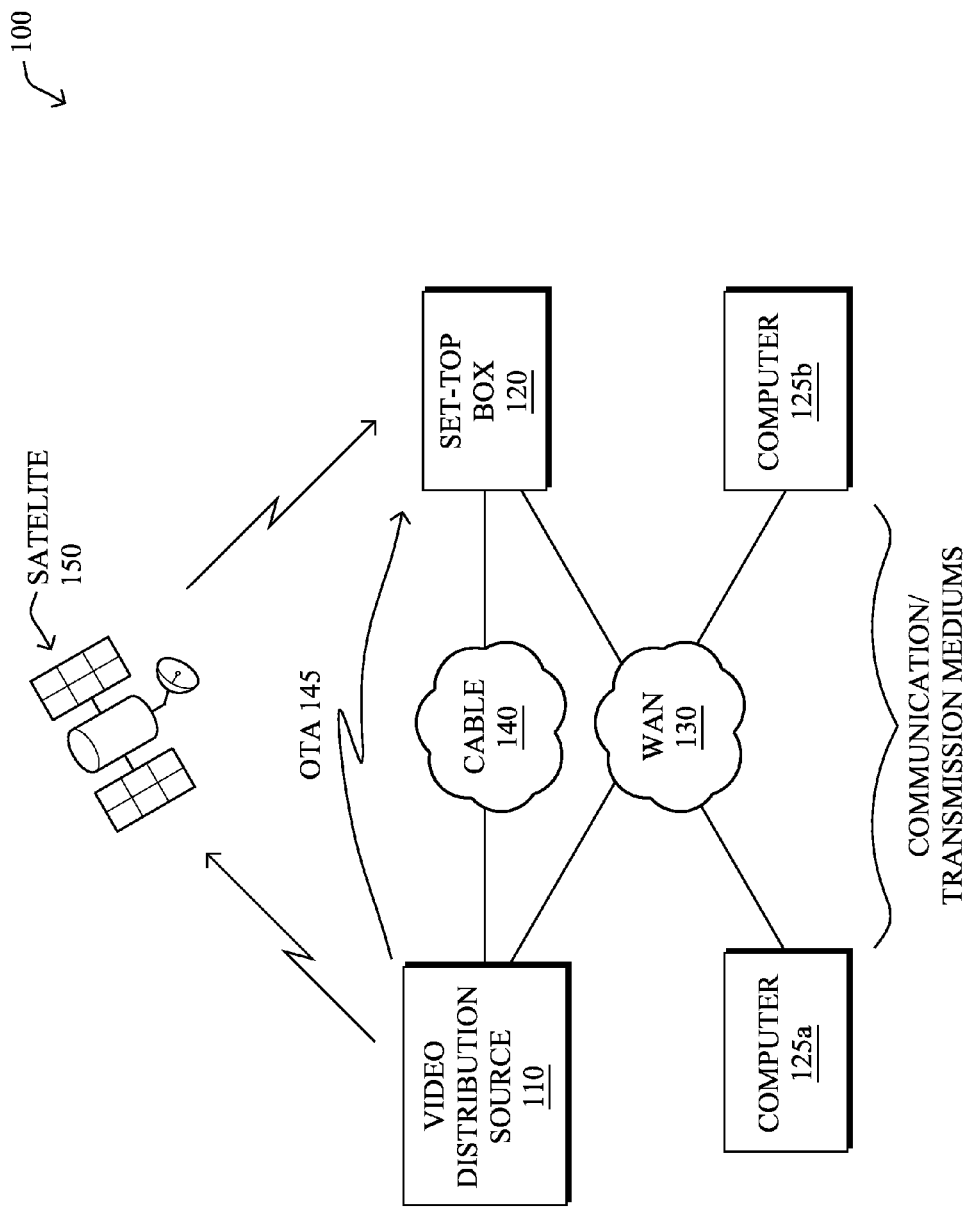
FIG. 1 illustrates an example video communication network.

FIG. 1 is a schematic block diagram of an example communication network 100 illustratively comprising nodes/devices, such as a video distribution source 110 configured to distribute video to one or more set-top boxes (STBs) 120 and/or one or more computers 125 (e.g., 125*a* and 125*b*). For instance, video may be distributed by source 110 in any number of available mediums, such as video-over-IP (Internet Protocol) via wide area network (WAN) 130, through a cable network 140, over-the-air (OTA) transmissions 145, or satellite transmission 150, etc. Also, in certain embodiments, a computer (e.g., personal computer or "PC") may distribute video over WAN 130 to other receiving devices, as will be appreciated by those skilled in the art. For example, two or more computers may participate in a video sharing application (video chat, online conferencing, etc.). Those skilled in the art will understand that any number of nodes, devices, links, etc. may be used in the communication network 100, and that the view shown herein is for simplicity.

Note that a set-top box 120 may consist of a converter box (e.g., a universal media server or "UMS") used by air (antenna), video digital subscriber line (DSL), IP, cable, and/or satellite service providers to convert proprietary signals (from video distribution source 110) into audio and/or video (A/V) outputs for STB users, e.g., images for a television and/or monitor. Similarly, a computer 125 may also be configured to convert such signals into A/V streams for display on an associated monitor (primarily these are DSL or IP signals, though other signals may also be converted provided proper equipment and configuration).

Figure 2A:
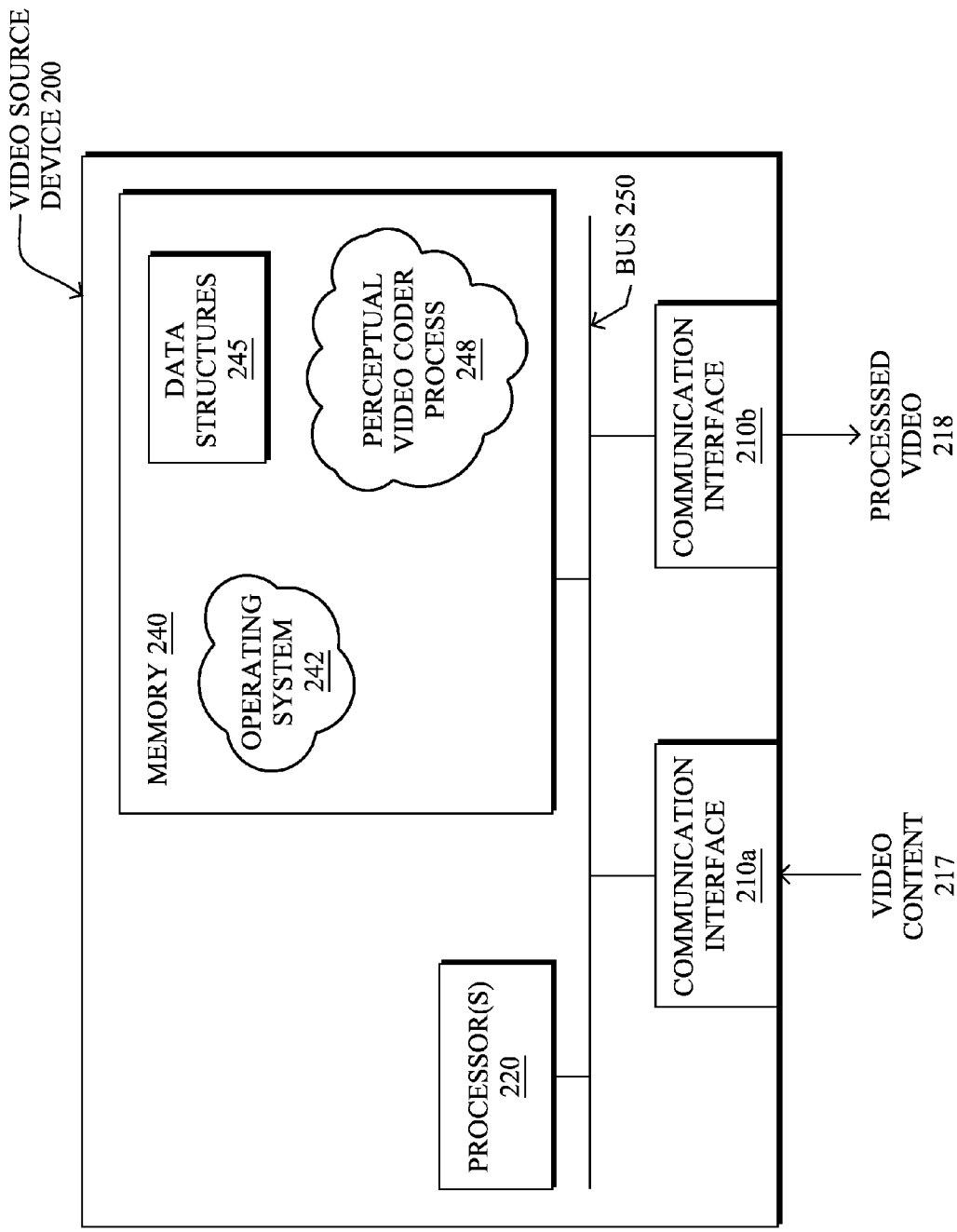
FIGS. 2A-2B illustrate an example device/node and video coder.

FIG. 2A is a schematic block diagram of an example node/device 200 that may be used with one or more embodiments described herein, e.g., as any node/device in FIG. 1 capable of encoding video as described herein, such as the video distribution source 110 and/or computers 125. The device may comprise one or more communication interfaces 210, at least one processor 220, and a memory 240 interconnected by a system bus 250.

The communication interface(s) 210 contain the mechanical, electrical, and signaling circuitry for communicating data (e.g., video) over various transmission mediums of the network 100. For instance, the interfaces may be configured to transmit and/or receive data using a variety of different communication protocols suitable for the transmission mediums as noted above and as will be understood by those skilled in the art. Note, further, that the device may have an input interface 210*a* and an output interface 210*b*, or else a single interface may be used for both input and output communication.

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245 (e.g., tables, maps, values, etc.). An operating system 242, portions of which are typically resident in memory 240 and executed by the processor, functionally organizes the device by, inter alia, invoking operations in support of software processes and/or services executing on the device. These software processes and/or services may comprise an illustrative perceptual video coder (e.g., encoder/decoder) process 248 for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes may have been shown separately, those skilled in the art will appreciate that processes may be routines or modules within other processes.

Figure 2B:
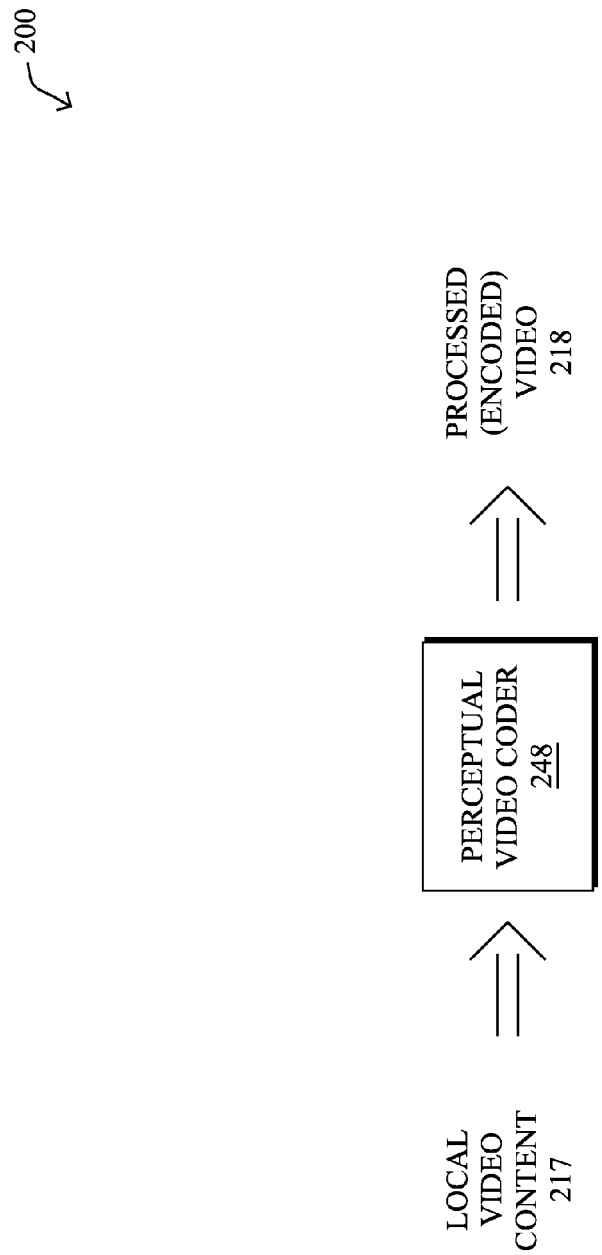

In addition, FIG. 2B illustrates an alternative view of the device 200, in which the device is modeled simply as a process/module. That is, a perceptual video coder 248 may receive raw video content 217 (i.e., at an input configured to obtain local video content, such as from another video source, a video repository/database, etc.), and output processed video (frames, regions, etc.) 218, according to the techniques described herein.

Illustratively, certain techniques described herein may be performed by hardware, software, and/or firmware, such as in accordance with perceptual video coder (process) 248, which may contain computer executable instructions executed by the processor 220 to perform functions relating to the novel techniques described herein, such as within a video distribution source 110, computer 125, etc. For example, the techniques herein may be treated as extensions/improvements to conventional protocols, such as adaptive quantization protocols, and as such, would be processed by similar components understood in the art that execute such protocols, accordingly.

Figure 3A:
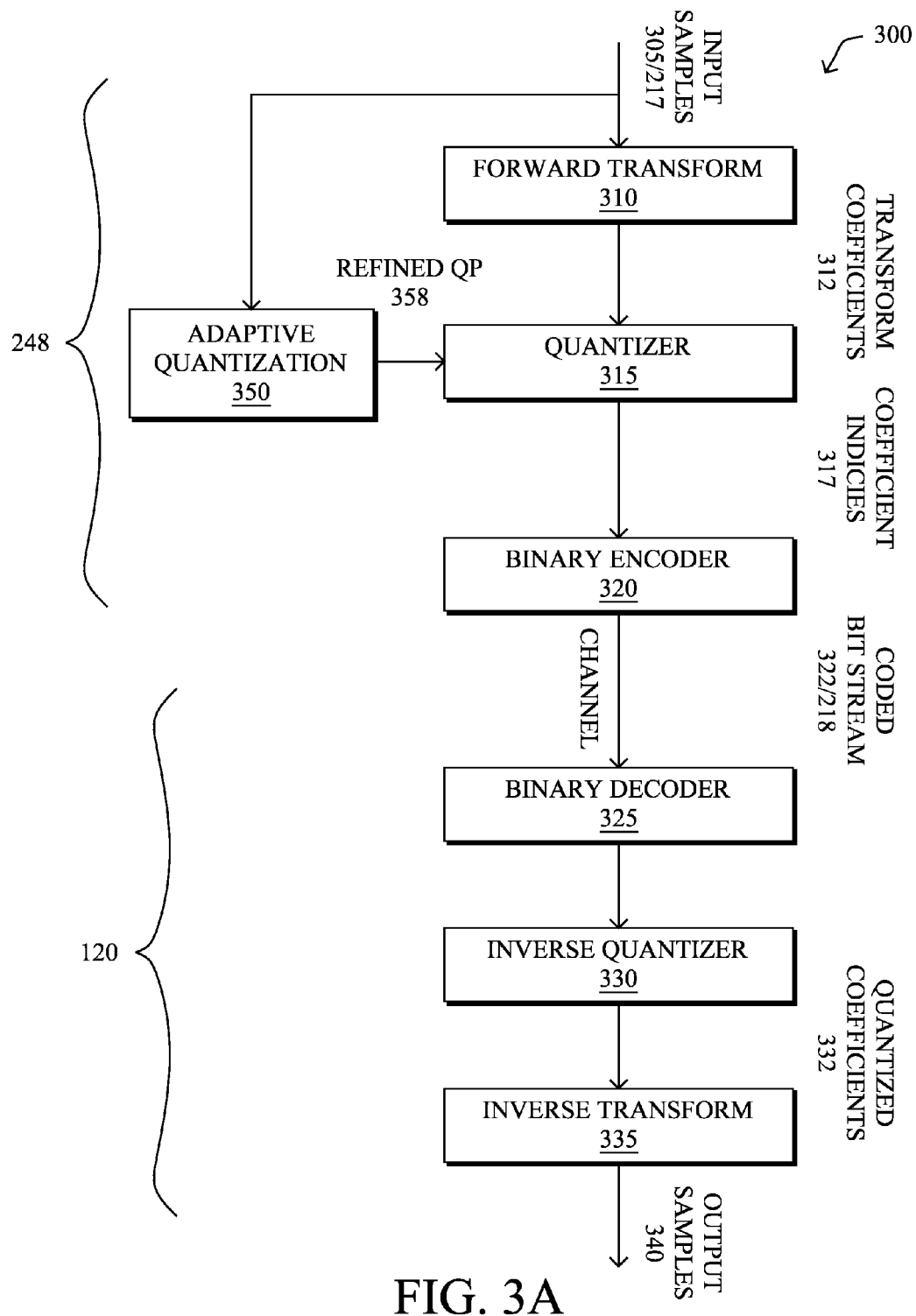
FIGS. 3A-3B illustrate example baseline procedures of adaptive quantization.

In addition, FIG. 3A illustrates an example flow of video as it is converted from is input samples into video output samples. Specifically, input video samples 305 (input 217) may enter a forward transform 310 (of a coder 248), and then resultant transform coefficients 312 may be input to a quantizer 315. Coefficient indices 317 may then be supplied to a binary encoder 320 to code the bit stream 322 (output 218) for transmission on the appropriate channel (communication medium) to a receiving binary decoder 325 (e.g., of a set-top box 120). To produce the output samples 340, an inverse quantizer 332 produces quantized coefficients 332, which through an inverse transform 335 results in the desired output samples 340.

As noted above, adaptive quantization plays a critical role at enhancing perceptual video quality in video encoding. The sensitivity of the Human Visual System (HVS) varies according to the local content of the video. That is, finer quantization is applied in regions where HVS is more sensitive, and coarser quantization is applied where HVS is less sensitive. The sensitivity of HVS may be characterized by various features such as motion, texture, contrast, etc. As such, an adaptive quantization technique 350 may create a "refined QP" (quantization parameter) 358 for refining the quantizer 315 operation, accordingly.

Figure 3B:
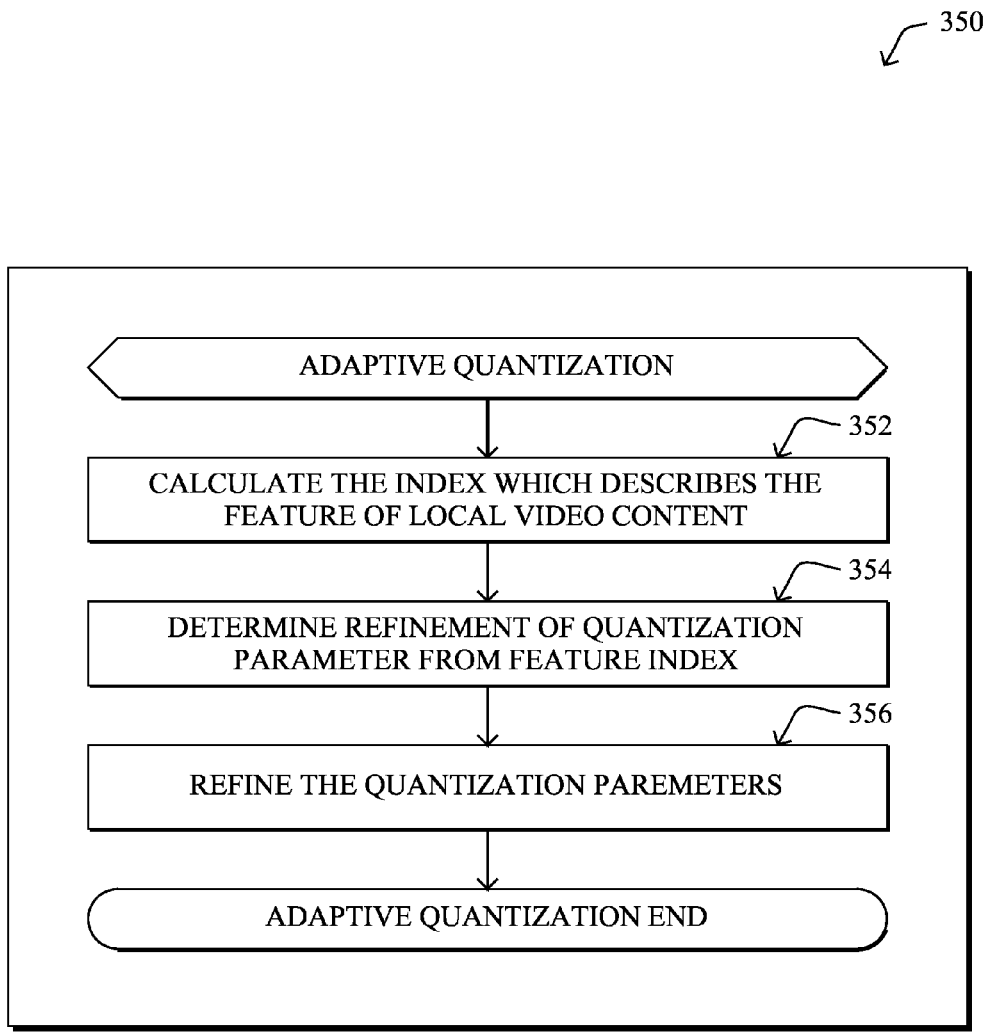

In particular, FIG. 3B illustrates an example baseline procedure "350" for adaptive quantization. Specifically, in step 352, for a particular feature of the video content, an index that corresponds to a region such as a macro-block (MB) is first calculated. The index value indicates how much the HVS is sensitive to the content of the region. At step 354, the refinement of a quantization parameter (QP), called "delta QP," for the region, is determined using this index, based on a model on this index, e.g., as shown in Eq. 1 below for the MB case:

$$\Delta QP_{MB} = \text{func}_{model}(\text{feature\_index}) \quad \text{(Eq. 1)}.$$

At the step 356, the delta QP is added to the previously set QP, which may be a global QP flat at the frame level or the slice level, as may be appreciated by those skilled in the art, in order to create the refined QP 358 output as shown in FIG. 3A. In the case of MB adaptive quantization, it can be explicitly expressed as follows, where $\Delta QP_{MB}$ is is from Eq. 1.:

$$QP_{MB} = \text{Original\_QP}_{MB} + \Delta QP_{MB} \quad \text{(Eq. 2)}.$$

With the revised/refined QP, the target quantization may then be performed for the region, such as by quantizer 315 of FIG. 3A. Note that in the well-known protocol "H.264", a QP value corresponds to a quantization step-size, which is used to quantize a Discrete Cosine Transform (DCT) coefficient via a scalar quantizer. The smaller the QP, the smaller the quantization step-size, and thus the more bits are generated. That is, quantization is usually controlled by a parameter QP in H.264, which implicitly determines a quantization step-size. In H.264, the smaller a QP is, the finer the coefficients are quantized, and vice versa. Adaptive quantization is reflected by adaptive selection of QP for different Macro-blocks (MB) in H.264, or equivalently reflected by a delta QP, defined as the difference between the MB level QP and the overall slice (frame) level QP. In other words, when a same QP is used for all MBs in a frame, the delta QPs are flat zeros. On the other hand, when adaptive quantization is used, the delta QPs varies: the delta QPs are positive for MBs where HVS is relatively less sensitive, and delta QPs are negative for MBs where the HVS is relatively more sensitive.

The effectiveness of such a solution relies on many factors, including but not limited to, the selection of a feature and the calculation of its index, the mapping of the delta QP from the feature index, and the control of bit-rate change due to the QP adjustment. Notably, it is generally difficult to set the values of the delta QPs for the MBs, even though it is well known that the values are relevant to the local video features such as motion, texture, contrast, etc.

Feature selection distinguishes the aspect which the adaptive quantization targets to improve for perceptual video quality. The feature can be motion, or texture, etc. As understood in the art, for a specific region, the intensity of a feature, called a feature index, is calculated based on the video content of the region using a mathematical formula.

Determination of delta QP from feature index generally includes model calculation or a decision-tree, etc. Based on previous observation or modeling, the feature index is mapped to a delta QP, as shown in Eq. 1. When multiple features are used, the aggregated delta QP is conventionally simply the sum of delta QPs of individual features. More specifically, when only two features, feature1 and feature2, are used for adaptive quantization for an MB, the aggregated delta QP for the MB is given as in Eq. 3:

$$\Delta QP_{MB} = \Delta QP_{MB\_feature1} + \Delta QP_{MS\_feature2} \quad \text{(Eq. 3)}.$$

In a first example currently available adaptive quantization system, three features are adopted for adaptive quantization: motion, high frequency, and DC. This system uses a linear fractional model to individually map the motion index, the high-frequency index and the DC index into three quantization step-size modulation factors, which are further mapped into delta QP equivalently (in H.264) using a logarithmic operation. More specifically, as an example, the delta QP corresponding to the motion feature for an MB is given by:

$$\Delta QP_{mot} = 6 \cdot \log_2\left(\frac{M_{MB} + \alpha_{mot} \cdot \overline{M}}{\alpha_{mot} \cdot M_{MB} + \overline{M}}\right), \quad (Eq.\ 4)$$

where $M_{MB}$ is the motion index for the MB, $\overline{M}$ is the motion index averaged over all MBs in a picture, and $\alpha_{mot}$ is a model parameter constant for all MBs.

In a second example currently available adaptive quantization system, variance of current video content is used as the feature index, where the variance can be considered as representing the texture. The variance of an MB is the sum of those of luminance component (Y) and two chrominance components (U and V), e.g., such as:

$$f_{texture} = (I_{MB\_Y} + I_{MB\_U} + I_{MB\_V}) \quad (Eq.\ 5).$$

Further, in this second example, a logarithmic model is used to map the feature index to the delta QP:

$$\Delta QP_{texture} = k \times 1.0397 \times \log_2(\max(f_{texture}, 1) - 14.427) \quad (Eq.\ 6).$$

Unlike the novel techniques described herein, these two examples of currently available adaptive quantization systems, however, are based on complex, computationally intensive, and indirectly mapped models and algorithms. Further, current techniques do not differentiate feature index selection based on video sources, nor do they adequately control bitrate change brought by modulated quantization. In particular, while it is known that the sensitivity of HVS varies according to the local content of the video, and that perceptual video encoding should apply finer quantization in regions where HVS is more sensitive, and vice versa (i.e., the general principle for mimicking HVS using adaptive quantization), the techniques described herein effectively and efficiently model the relationship between the adaptive quantization and the HVS sensitivity/insensitivity.

Specifically, according to one or more embodiments of the disclosure as described in greater detail below, a perceptual video coder obtains local video content, and calculates a feature index for one or more features of a video unit (e.g., macro-block, region, frame, etc.) of the local video content. The feature index is then directly mapped to a delta QP using a linear fractional model that explicitly establishes a relation between the delta QP and an HVS insensitivity (or sensitivity) index, where: i) if a local strength of the HVS insensitivity index equals an overall strength of a particular frame of the local video content, then delta QP is zero, ii) if the local strength of the HVS insensitivity index is greater than the overall strength of the particular frame of the local video content, then delta QP is greater than zero to provide coarser quantization, and iii) if the local strength of the HVS insensitivity index is less than the overall strength of the particular frame of the local video content, then delta QP is less than zero to provide finer quantization. Accordingly, a QP of an adaptive quantization may be refined by adding the delta QP to the QP, such that the adaptive quantization may be performed on the video unit (e.g., macro-block, region, frame, etc.) of the local video content based on the refined QP. Additional aspects and features of the embodiments herein are also described below that may provide further enhancements to conventional adaptive quantization techniques.

Operationally, feature selection according to one or more illustrative embodiments herein comprises selecting features corresponding to the nature of video source. It is well-known that when the frame rate of the source is relatively high, HVS is more sensitive to low textured areas and low motion areas. Thus for camera video, texture and motion may be selected as features. In contrast, for desktop video where the frame rate is relative low, texture and stillness may be selected because HVS becomes more sensitive to plain areas and the changed areas under such a low frame rate. Other video sources are of course available, and as such, other feature selections may also be made in accordance with the techniques herein.

The calculation of the feature index for the selected feature(s) of the local video content above is thus also determined in correspondence to the nature of video source. For example, camera video often contains fine gradient color and gradual motion. So the variance of the original video is calculated as a texture index and the variance of the motion-compensated residual video is calculated as a motion index. In desktop video, on the other hand, the changes commonly happen only in one part of the whole picture, and the other screen area remains the same. In such a case, the updated pixel number in each macro-block is defined as a stillness index. Additionally, based on the fact that desktop video generally contains compound content such as textual and true color image, the number of textual pixels may also be used as a texture index.

As noted above, a key component of the embodiments herein is a linear fractional model for directly mapping a delta QP from the feature index, where the model explicitly establishes a relation between delta QP and an HVS insensitivity index. Note that the sensitivity of HVS may be characterized by various features such as motion, texture, contrast, etc., and that for a particular feature of the video content, an index corresponding to a region such as a macro-block (MB) indicates how much the HVS is sensitive to the content of the region. For convenience, the HVS insensitivity index is used to replace the HVS sensitivity index in this description, though clearly, they are equivalent. As an example to illustrate the concept of HVS insensitivity, the larger a motion index (the larger the local motion), the less the HVS is sensitive to this area. On the contrary, the smaller the motion index, the more the HVS is sensitive to the area. In other words, people/viewers can usually tolerate artifacts in a highly moving area in comparison with artifacts in a static/slowly moving area.

In particular, according to an illustrative embodiment herein, a linear fractional model is defined as:

$$\Delta QP_{feature} = c \times \frac{\frac{I_{MB}}{\overline{I_{MB}}} + a}{\frac{I_{MB}}{\overline{I_{MB}}} + b}, \quad (Eq.\ 7)$$

which maps the feature index to the delta QP, where a, b, and c are model constants, e.g., where [a<0, b>0, c>0] (each of which, notably, may be specifically selected based on the one or more features of the local video content), and $I_{MB}$ is the feature index for an individual MB and $\overline{I_{MB}}$ is the average feature index for a whole frame. According to the model, delta QP may thus monotonically increase from its minimal value $$\left( c \times \frac{a}{b} \right)$$

when $I_{MB}=0$ to its maximal value c when $$\frac{I_{MB}}{\overline{I_{MB}}}$$

goes to relatively larger values. Note that $$\frac{I_{MB}}{\overline{I_{MB}}}$$

may generally be classified as the local strength of the HVS insensitivity index, i.e., the local strength of the HVS insensitivity index may be computed as a feature index for an individual macro-block (MB) divided by an average feature index for the entire frame.

Figure 4:
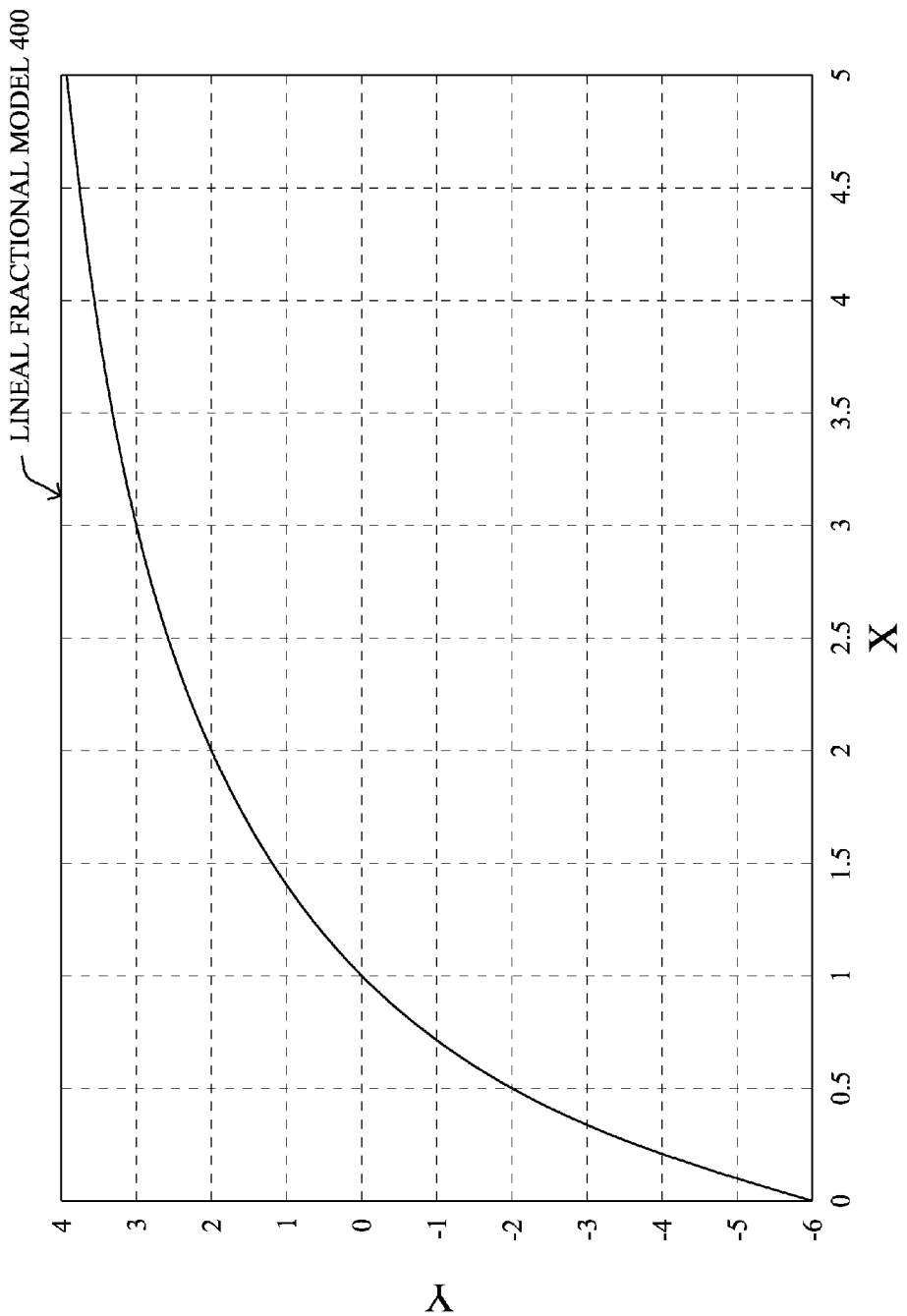
FIG. 4 illustrates an example linear fractional model mapping delta quantization parameter (QP) to a human Visual System (HVS) insensitivity index.

FIG. 4 illustrates a graph of delta QP as a function of $$\frac{I_{MB}}{\overline{I_{MB}}},$$

e.g., according to an example linear fractional model 400 using constants: a=−1, b=0.9910, c=5.8185. (Again, different model constants [a, b, c] may be used for different features, since the trend of HVS sensitivity with respect to the feature may differ.) The "X" axis represents the relative strength of an HVS insensitivity index, e.g., $$\frac{I_{MB}}{\overline{I_{MB}}},$$

while the "Y" axis represents the corresponding delta QP. The model 400 thus directly maps the delta QP from feature index of the video content, and as such, considerably saves computational complexity in model calculation. Note that the model is generally asymmetric in the sense that the minimal delta QP is not equal to the maximal delta QP. The asymmetry of the model allows a special emphasis of adaptive quantization for the regions with lower feature index or higher feature index.

From the graph shown in FIG. 4, it can clearly be seen that the model 400 precisely displays the expected behavior based on the HVS, i.e., that:
  i) when X=1, i.e., the local strength of an HVS insensitivity index is equal to the overall strength of the frame, delta QP is 0, meaning that there is no need to adjust the local QP;
  ii) when X>1, i.e., the local strength of an HVS insensitivity index is larger than the overall strength of the frame, delta QP is larger than 0, meaning that the local QP has to be enlarged, resulting in more coarse quantization; and
  iii) when X<1, i.e., the local strength of an HVS insensitivity index is smaller than the overall strength of the frame, delta QP is smaller than 0, meaning that the local QP has to be reduced, resulting in finer quantization.

Accordingly, features of the model 400 provide benefits over existing approaches, e.g., those mentioned above. In particular, the techniques herein establish an explicit model, while the current techniques set an adaptive QP in a heuristic way, which usually lack solid and systematic justifications. Further, the techniques herein optimally select model parameters, e.g., which can be determined through offline training. Moreover, the model is reusable for different HVS sensitivity features, since only a parameter change is needed as the trend of HVS sensitivity with respect to the feature may differ.

Note that adaptive quantization usually results in bit-rate changes compared with original encoding without adaptive quantization. Bit-rate variation can create difficulties for rate control, and as such, the impact of the bit-rate change brought by adaptive quantization should be taken into account. As such, various embodiments herein may also provide techniques to control a change in a bit-rate of the local video content due to performance of the adaptive quantization, e.g., as described below.

Central axis adjustment is one such element introduced to achieve a balance of bit-rate change, namely, adjusting a central axis of the direct mapping by a configured parameter, such that whether the local strength of the HVS insensitivity index is greater than, equal to, or less than the overall strength of the particular frame of the local video content is adjusted based on the configured parameter. Specifically, for a model in Eq. 7 above defined by a set of parameters [a, b, c], the central axis is defined to be the point where delta QP=0. To the left of the central axis, the corresponding delta QP is negative and thus the bit-rate increases due to the QP decrease; on the contrary, to the right of the central axis, the corresponding delta QP is positive and thus the bit-rate decreases due to the QP increase. Therefore, adjusting the central axis of the model can achieve the balance of bit-rate change due to adaptive quantization. For this purpose, an additional parameter "k" can be introduced to adjust the average feature index, i.e., the new model becomes:

$$\Delta QP_{feature} = c \times \frac{\frac{I_{MB}}{k \times \overline{I_{MB}}} + a}{\frac{I_{MB}}{k \times \overline{I_{MB}}} + b}, \quad \text{(Eq. 8)}$$

where k is a positive constant.

Figure 5:
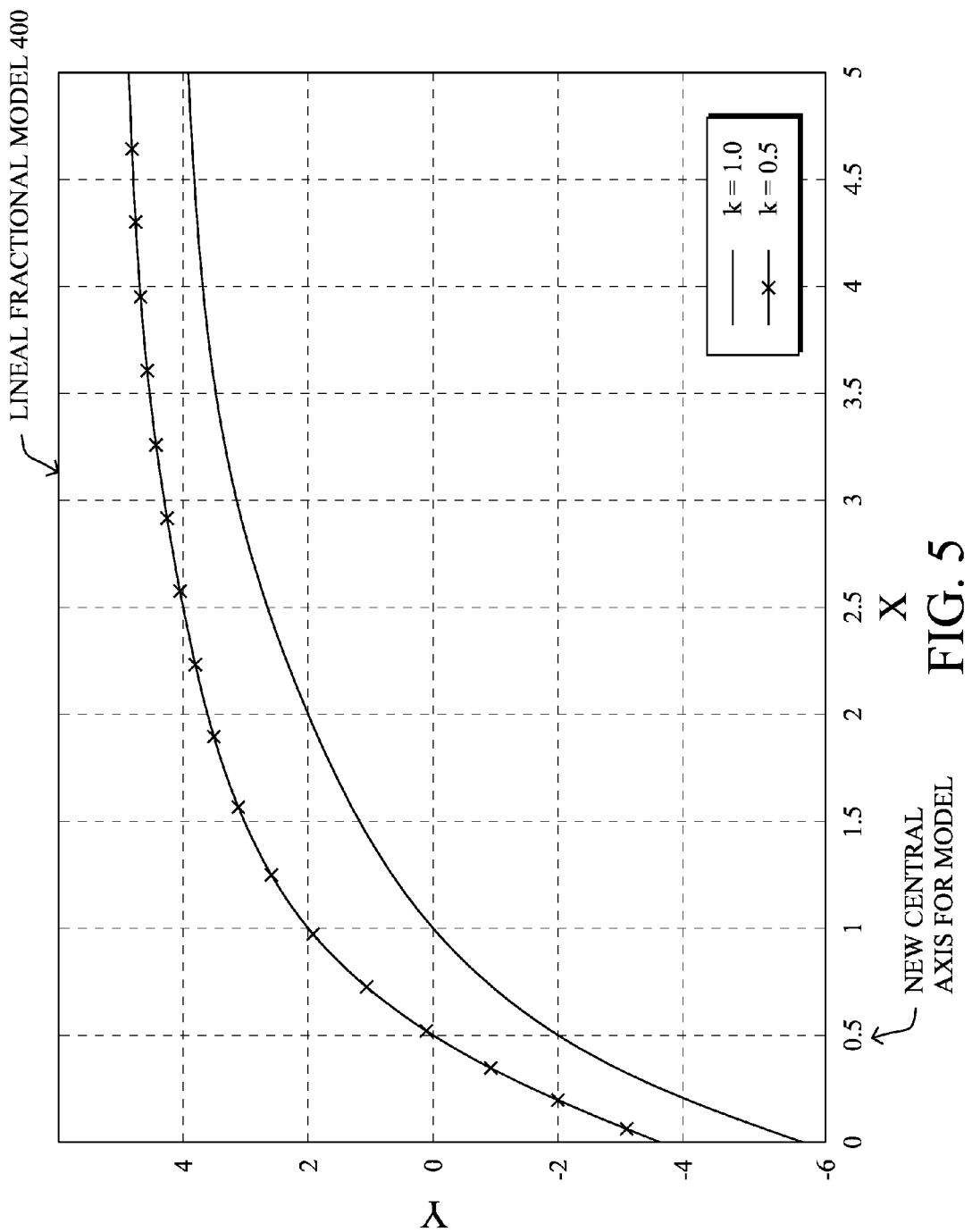
FIG. 5 illustrates an example linear fractional model with a central axis adjustment.

FIG. 5 shows the comparison of the model with central axis adjustment (k=0.5) to the model without central axis adjustment (k=1). Note that another way to view the linear fractional model for delta QP with the central axis adjustment is to update the model 400 with new parameters. That is, while the original model is defined by the parameters [a, b, c], these parameters may be replaced by a new model defined by a new set of parameters (k*a, k*b, c).

Another element herein to control a change in a bit-rate is to handle the effect caused by an overlap of a feature index. In particular, one feature index may overlap with another due to, e.g., the non-precise representations of the feature indices. In this case, delta QP limitation may be utilized to eliminate the repetitive effect of adaptive quantization. For instance, if texture index is the variance of a current macro-block, and motion index is the variance of residual between collocated macro-blocks and a current macro-block, there will be an overlap between texture index and motion index. In such a case, as an illustrative example, if ΔQP>=0 for a motion model, then the overlap is allowed, while if ΔQP<0, the overlap is not allowed, thus limiting delta QP, in order to enhance the video quality of low motion areas, i.e., such that:

$$\Delta QP_{MB} = \begin{cases} \Delta QP_{motion} + \Delta QP_{texture}, \text{ if } (\Delta QP_{motion} >= 0) \\ \Delta QP_{texture}, \text{ if } (\Delta QP_{motion} < 0). \end{cases} \quad \text{(Eq. 9)}$$

To further control the significant change of bit-rate at the frame level due to MB level QP adjustment, according to techniques herein, a frame-level adjustment may be performed through adaptive feedback by changing (adaptively tuning) the delta QP from an absolute value to a relative value. That is, the delta QP of each region/macro-block (MB) in a frame may be further adjusted by subtracting the average of delta QP of all regions/MBs in the frame, so that the sum of delta QPs of all regions/MBs in the frame is zero. More specifically:

$$\Delta QP'_{MB} = \Delta QP_{MB} - \overline{\Delta QP_{MB}}, \quad \text{(Eq. 10)}$$

where $$\overline{\Delta QP_{MB}} = \left(\sum_N \Delta QP_{MB}\right)/N,$$

which is the average of delta QPs of all MBs in the frame.

Based on each of the techniques, aspects, and embodiments described above in various configurations and combinations, therefore, the QP of an adaptive quantization may be refined by adding the resultant delta QP to the QP, and as such, the adaptive quantization may be performed on the frame of the local video content (e.g., a particular region) based on the refined QP.

Figure 6:
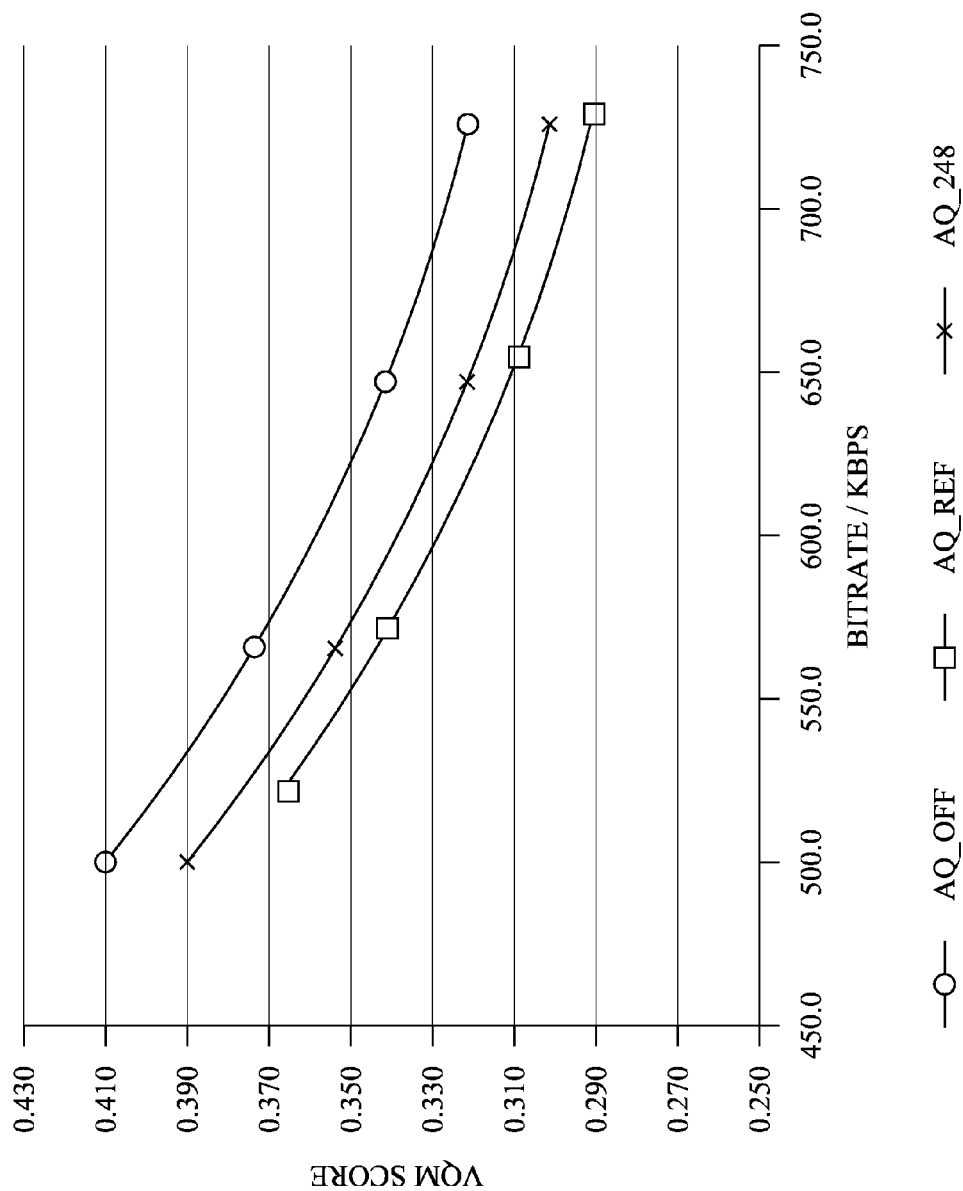
FIG. 6 illustrates an example comparison of bit-rate-to-VQM (Video Quality Metric) performance for different encoders with/without adaptive quantization.

Experimental results showing the video quality improvement using the proposed techniques for adaptive quantization (AQ) are shown in FIG. 6. In particular, three sets of experiments were performed:

a) AQ off (AQ_OFF), i.e., the encoder with no AQ;
b) currently available reference AQ (AQ_REF);
c) the encoder (coder 248) (AQ_248), using the AQ model for two features: texture (e.g., illustratively with [a=−1, b=0.9910, c=5.8185, k=0.5] as model is parameters) and motion (e.g., illustratively with [a=−1, b=0.9910, c=5.8185, k=0.3] as model parameters).

For example, assume that three images are compared showing decoded pictures of a same frame encoded using three encoders: AQ_OFF, AQ_REF and AQ_248, respectively. Based on the techniques above, the AQ_248 improves the overall subjective quality, while the image encoded with AQ_OFF is overall "blocky", and when viewed in a sequence, the "blockiness" becomes a significant artifact since the unaligned blockiness from frame to frame results in eye catching motion artifacts. However, using AQ generates an overall smoother video with subjectively less artifacts.

The overall improvement of the subjective video quality with the AQ_248 may be illustrated through rate distortion curves shown in FIG. 6. For instance, it is widely known that the PSNR (Peak-Signal-to-Noise Ratio) is not a good subjective video quality (distortion) metric. A better metric is the Video Quality Metric (VQM), which is a standardized method of objectively measuring video quality that closely predicts the subjective quality ratings that would be obtained from a panel of human viewers. VQM has been shown to correlate best with Mean Opinion Score (MOS) of subjective evaluation, compared to other video quality metrics such as PSNR. A VQM score is a number between 0 for no perceived impairment to 1 for maximum perceived impairment.

FIG. 6, then is a comparison of bit-rate-to-VQM performance for different encoders with/without AQ, i.e., AQ_OFF, AQ_REF, and AQ_248. It is clear that at all testing rate points the corresponding VQM scores of the AQ_248 encoder described herein are lower than those of the encoder without AQ, meaning that better subjective quality is achieved with AQ_248 described herein. Note that the performance measurements between the complex and computationally intensive AQ_REF and the simpler, directly mapped, and bit-rate controlled AQ_248 herein performs very similarly. As such, the techniques herein achieve substantially the same result as more complex, less efficient AQ techniques currently available (AQ_REF).

Figure 7A:
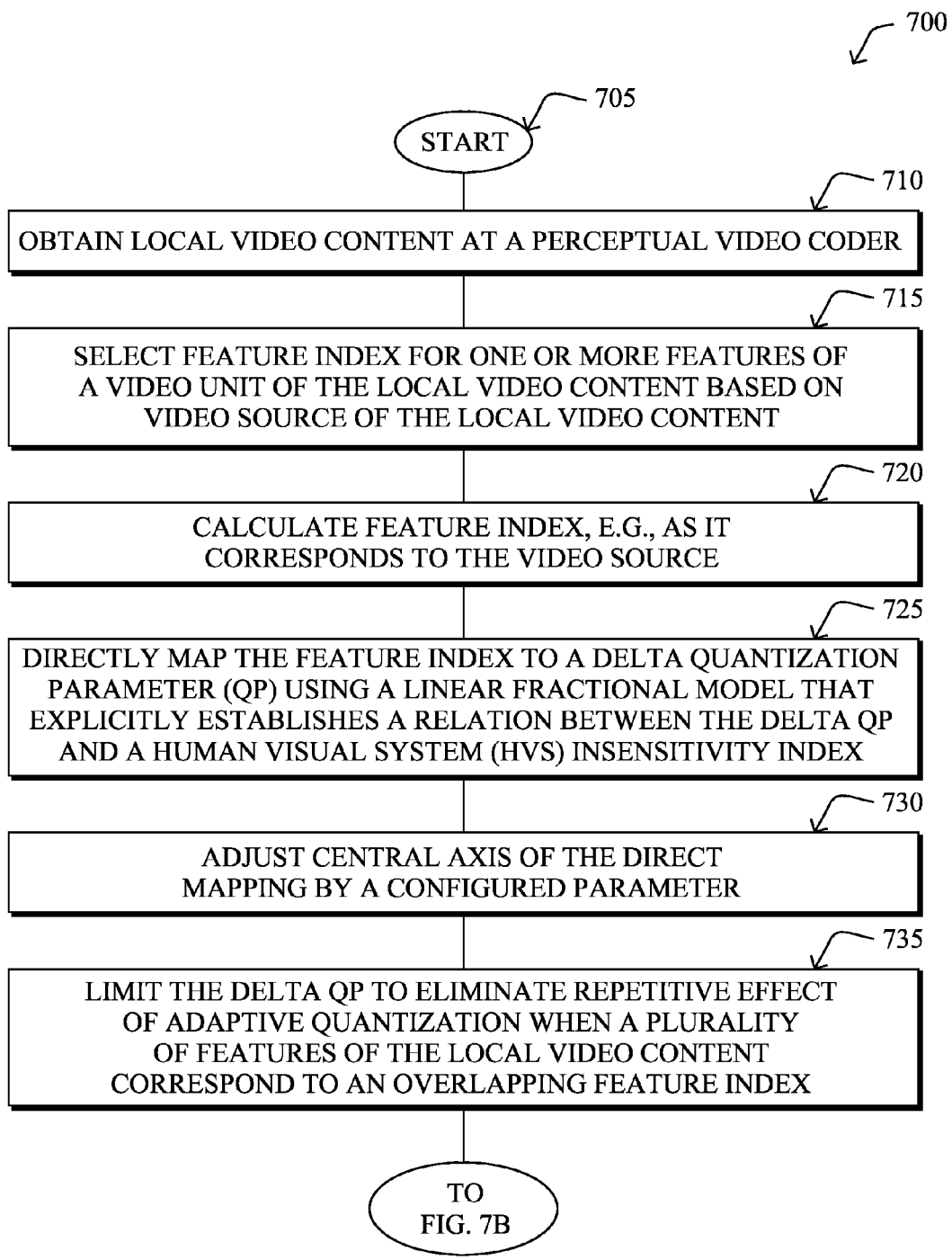
FIGS. 7A-B illustrate an example simplified procedure for adaptive quantization for perceptual video coding in accordance with one or more embodiments described herein.
Figure 7B:
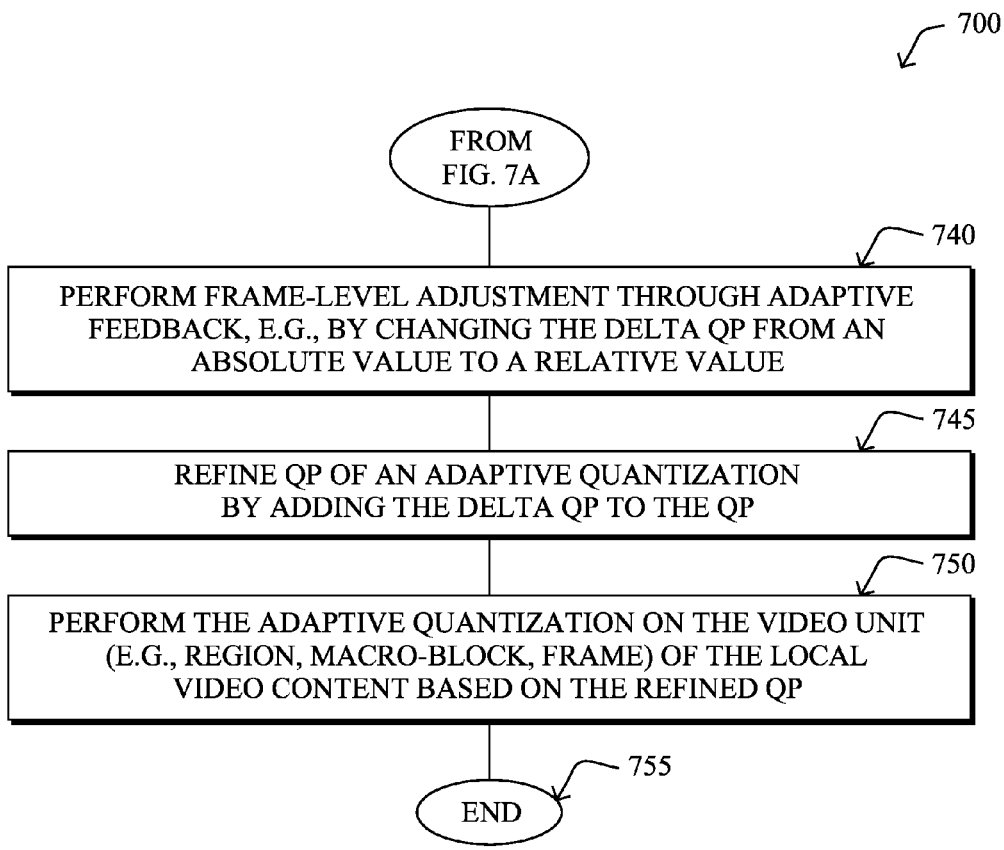

FIGS. 7A-B illustrate an example simplified procedure for adaptive quantization for perceptual video coding in accordance with one or more embodiments described herein. The procedure 700 starts at step 705, and continues to step 710, where, as described in greater detail above, a perceptual video coder 248 obtains local video content 217. In step 715, the coder selects the feature index for each of one or more features of the video unit of the local video content based on the video source of the local video content, e.g., camera video, desktop video, etc., and in step 720 calculates the feature index, e.g., as it corresponds to the video source, as described in detail above.

Accordingly, in step 725 each feature index is directly mapped to a delta QP using a linear fractional model as described herein that explicitly establishes a relation between the delta QP and an HVS insensitivity index. For instance, as noted above, according to the (asymmetrical) linear fractional model, if a local strength of the HVS insensitivity index i) equals, ii) is greater than, or iii) is less than an overall strength of a particular frame of the local video content, then delta QP is i) zero, ii) greater than zero to provide coarser quantization, or iii) less than zero to provide finer quantization, respectively.

Note that according to certain specific embodiments herein, various techniques may also be performed, e.g., to control a change in a bit-rate of the local video content due to performance of the adaptive quantization. For instance, as mentioned above, the coder 248 may adjust the central axis of the direct mapping by a configured parameter (e.g., "k") in step 730. As further mentioned above, in step 735 the coder may limit the delta QP to eliminate the repetitive effect of adaptive quantization when a plurality of features of the local video content correspond to an overlapping feature index. Still further, the coder may perform frame-level adjustment through adaptive feedback, e.g., by changing the delta QP from an absolute value to a relative value in step 740, as described above.

Once the delta QP has been determined according to the techniques above, in step 745 the QP of an adaptive quantization is refined by adding each delta QP to the QP (or similarly subtracting, applying, combining, or otherwise basing the refined QP on the delta QP). As such, in step 750, adaptive quantization is performed on the video unit (e.g., macro-block, region, frame, etc.) of the local video content based on the refined QP (for the corresponding video unit), and the procedure, for that particular frame/region, ends in step 755.

It should be noted that while certain steps within procedure 700 may be optional as described above, the steps shown in FIGS. 7A-B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein thus improve adaptive quantization for perceptual video coding. In particular, based on the characteristics of common video sources, different feature indices may be accordingly selected, and the asymmetrical linear fractional model and its central axis adjustment provide improved mapping from the feature index to the delta QP. Also, as described herein, the process of delta QP limitation deals with the inevitable non-preciseness of feature index representation, and the adaptive feedback mechanism controls the bit-rate change at the frame level.

Compared to currently available systems, the techniques herein take into account more factors to enhance the effectiveness of adaptive quantization for practical applications. First, the techniques herein emphasize the control of the bit-rate change brought by modulated quantization, through central axis adjustment, delta QP limitation, and an adaptive feedback mechanism. Second, a simpler model achieves direct mapping from the feature index to the delta QP, resulting in significant computational saving without degradation of the effectiveness of adaptive quantization. Third, differentiation of video sources for feature index selection makes adaptive quantization more effective for different video resources. In particular, any video encoder using adaptive quantization for subjective video quality improvement would thus benefit from the techniques herein to significantly improve the perceptual video quality, especially in situations with a low bit-rate.

While there have been shown and described illustrative embodiments that improve adaptive quantization for perceptual video coding, it is to be understood that various other adaptations and modifications may be made within the spirit and scope of the embodiments herein. For example, the embodiments have been shown and described herein with relation to certain video-based protocols, and/or to terms currently understood by those skilled in the art. However, the embodiments in their broader sense are not as limited, and may, in fact, be used with other protocols and/or terms of art (whether currently used or defined in the future) to which the techniques herein may be suitably applied. For instance, while the novel techniques defined herein may be applied to currently available quantization systems when performing the adaptive quantization on the frame, i.e., based on the refined QP as described above, the techniques to refine the QP as described above may be used with any suitable quantization system. Also, as noted herein, the techniques are performed based on the video unit, which may thus be performed based on macro-blocks (MBs) within the frame, or regions within the frame, or a frame. The techniques herein may be macro-block-based, or region-based, or frame-based, etc., such as refining a QP for each of one or more MBs of a frame, or refining a QP for each of one or more regions of a frame, or refining a single QP for the entire frame, etc., and as such, references to frames, regions, or other granularities of local video content are merely representative examples, and are not meant to limit the scope of the embodiments herein.

In particular, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) to computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the is embodiments herein.

What is claimed is:

1. A method, comprising:
obtaining local video content at a perceptual video coder;
calculating a feature index for each of one or more features of a video unit of the local video content;
directly mapping each feature index to a delta quantization parameter (QP) using a linear fractional model that explicitly establishes a relation between the delta QP and a Human Visual System (HVS) insensitivity index wherein the linear fractional model establishes that the delta QP is equal to: a first constant "c" times (a local strength of the HVS insensitivity index plus a second constant "a")/(the local strength of the HVS insensitivity index plus a second constant "b"), where a<0, b>0, and c>0;
refining a QP of an adaptive quantization by adding each delta QP to the QP; and
performing the adaptive quantization on the video unit of the local video content based on the refined QP.

2. The method as in claim 1, wherein according to directly mapping each feature index to the delta QP:
i) if a local strength of the HVS insensitivity index equals an overall strength of a particular frame of the local video content, then delta QP is zero,
ii) if the local strength of the HVS insensitivity index is greater than the overall strength of the particular frame of the local video content, then delta QP is greater than zero to provide coarser quantization, and
iii) if the local strength of the HVS insensitivity index is less than the overall strength of the particular frame of the local video content, then delta QP is less than zero to provide finer quantization.

3. The method as in claim 2, further comprising:
adjusting a central axis of the direct mapping by a configured parameter, wherein whether the local strength of the HVS insensitivity index is greater than, equal to, or less than the overall strength of the particular frame of the local video content is adjusted based on the configured parameter.

4. The method as in claim 1, further comprising:
selecting the feature index based on a video source of the local video content, wherein the feature index calculated as it corresponds to the video source.

5. The method as in claim 1, further comprising:
selecting the one or more features of the local video content based on a video source of the local video content.

6. The method as in claim 1, further comprising:
computing the local strength of the HVS insensitivity index as: a feature index for an individual region divided by an average feature index for an entire frame of the local video content.

7. The method as in claim 1, further comprising:
for each particular feature, selecting constants a, b, and c based on the corresponding particular feature of the local video content.

8. The method as in claim 1, further comprising:
limiting the delta QP to eliminate a repetitive effect of the adaptive quantization when a plurality of features of the local video content correspond to an overlapping feature index.

9. The method as in claim 1, further comprising:
performing a frame-level adjustment through adaptive feedback by changing the delta QP from an absolute value to a relative value.

10. The method as in claim 9, wherein changing the delta QP comprises:
subtracting an average delta QP of all regions in a frame from the a delta QP of each region in the frame, wherein the sum of all of the delta QPs of all regions in the frame is zero.

11. The method as in claim 1, wherein the video unit is selected from a group consisting of: a frame, a region, and a macro-block.

12. A tangible, non-transitory, computer-readable media having software encoded thereon, the software when executed by a processor operable to:
obtain local video content;
calculate a feature index for each of one or more features of a video unit of the local video content;
directly map each feature index to a delta quantization parameter (QP) using a linear fractional model that explicitly establishes a relation between the delta QP and a Human Visual System (HVS) insensitivity index wherein the linear fractional model establishes that the delta QP is equal to: a first constant "c" times (a local strength of the HVS insensitivity index plus a second constant "a")/(the local strength of the HVS insensitivity index plus a second constant "b"), where a<0, b>0, and c>0;
refine a QP of an adaptive quantization by adding each delta QP to the QP; and
perform the adaptive quantization on the video unit of the local video content based on the refined QP.

13. The computer-readable media as in claim 12, wherein according to directly mapping each feature index to the delta QP:
i) if a local strength of the HVS insensitivity index equals an overall strength of a particular frame of the local video content, then delta QP is zero,
ii) if the local strength of the HVS insensitivity index is greater than the overall strength of the particular frame of the local video content, then delta QP is greater than zero to provide coarser quantization, and
iii) if the local strength of the HVS insensitivity index is less than the overall strength of the particular frame of the local video content, then delta QP is less than zero to provide finer quantization.

14. The computer-readable media as in claim 13, wherein the software when executed is further operable to:
adjust a central axis of the direct mapping by a configured parameter, wherein whether the local strength of the HVS insensitivity index is greater than, equal to, or less than the overall strength of the particular frame of the local video content is adjusted based on the configured parameter.

15. The computer-readable media as in claim 12, wherein the software when executed is further operable to:
select the feature index based on a video source of the local video content, wherein the feature index calculated as it corresponds to the video source.

16. The computer-readable media as in claim 12, wherein the software when executed is further operable to:
select the one or more features of the local video content based on a video source of the local video content.

17. The computer-readable media as in claim 12, wherein the software when executed is further operable to:
compute the local strength of the HVS insensitivity index as: a feature index for an individual region divided by an average feature index for an entire frame of the local video content.

18. The computer-readable media as in claim 12, wherein the software when executed is further operable to:
for each particular feature, select constants a, b, and c based on the corresponding particular feature of the local video content.

19. The computer-readable media as in claim 12, wherein the software when executed is further operable to:
limit the delta QP to eliminate a repetitive effect of the adaptive quantization when a plurality of features of the local video content correspond to an overlapping feature index.

20. The computer-readable media as in claim 12, wherein the software when executed is further operable to:
perform a frame-level adjustment through adaptive feedback by changing the delta QP from an absolute value to a relative value.

21. The computer-readable media as in claim 20, wherein the software when executed to change the delta QP is further operable to:
subtract an average delta QP of all regions in a frame from the a delta QP of each region in the frame, wherein the sum of all of the delta QPs of all regions in the frame is zero.

22. The computer-readable media as in claim 21, wherein the video unit is selected from a group consisting of: a frame, a region, and a macro-block.

23. An apparatus, comprising:
an input configured to obtain local video content;
a processor coupled to the input and configured to execute one or more processes; and
a memory configured to store a perceptual video coding process executable by the processor, the process when executed operable to:
calculate a feature index for each of one or more features of a video unit of the local video content;
directly map each feature index to a delta quantization parameter (QP) using a linear fractional model that explicitly establishes a relation between the delta QP and a Human Visual System (HVS) insensitivity index wherein the linear fractional model establishes that the delta QP is equal to: a first constant "c" times (a local strength of the HVS insensitivity index plus a second constant "a")/(the local strength of the HVS insensitivity index plus a second constant "b"), where a<0, b>0, and c>0;
refine a QP of an adaptive quantization by adding each delta QP to the QP; and
perform the adaptive quantization on the video unit of the local video content based on the refined QP.

* * * * *